(12) United States Patent
Lawless

(10) Patent No.: US 6,536,114 B2
(45) Date of Patent: Mar. 25, 2003

(54) BOILED EGG SHELL RIPPER

(76) Inventor: Richard A. Lawless, 568 E. Crothersville Rd., Austin, IN (US) 47102

( * ) Notice: Subject to any disclaimer, the term of this patent is extended or adjusted under 35 U.S.C. 154(b) by 0 days.

(21) Appl. No.: 09/778,605

(22) Filed: Feb. 7, 2001

(65) Prior Publication Data

US 2002/0104218 A1 Aug. 8, 2002

(51) Int. Cl.$^7$ ................................................ A47J 43/28
(52) U.S. Cl. ........................... 30/120.1; 30/322; 30/137
(58) Field of Search ........................... 30/322, 323, 137, 30/147, 148, 150, 120.1; D7/653, 663, 662

(56) References Cited

U.S. PATENT DOCUMENTS

| D28,444 S | * | 4/1898 | Richardson | D7/663 |
| 1,322,981 A | * | 11/1919 | Waller | 30/322 |
| 1,644,119 A | * | 10/1927 | Fowler | 30/120.1 |
| 1,856,769 A | * | 5/1932 | Latshaw | 30/322 |
| 2,424,425 A | | 7/1947 | Yates | |
| 2,535,980 A | | 12/1950 | Yeamans | |
| 3,552,458 A | | 1/1971 | Whitman | |
| 3,612,122 A | | 10/1971 | Bjork | |
| 4,056,051 A | | 11/1977 | Brown | |
| 4,106,402 A | | 8/1978 | Gevas | |
| 4,117,774 A | | 10/1978 | Wilburn et al. | |
| 4,149,456 A | | 4/1979 | Gisonni | |
| 4,182,234 A | | 1/1980 | Reed | |
| 4,191,102 A | | 3/1980 | Cope | |
| 4,691,440 A | * | 9/1987 | Ushigome | 30/322 |
| 4,787,306 A | | 11/1988 | Johnson | |

FOREIGN PATENT DOCUMENTS

| CA | 517478 | * | 10/1955 | 30/322 |
| DE | 695300 | * | 8/1940 | 30/322 |
| GB | 490823 | * | 8/1938 | 30/322 |
| SE | 38160 | * | 1/1915 | 30/322 |

* cited by examiner

Primary Examiner—Hwei-Siu Payer
(74) Attorney, Agent, or Firm—Carrithers Law Office; David W. Carrithers

(57) ABSTRACT

A hand tool to facilitate removing the shell from a hard boiled egg. The tool has an egg shell ripper prong disposed between a spaced apart pair of members that engage the outer surface of the egg shell and limit the depth of penetration of the ripper prong.

8 Claims, 2 Drawing Sheets

BOILED EGG SHELL RIPPER

BACKGROUND OF THE INVENTION

1. Technical Field

This invention relates to a hand tool and more particularly a hand tool for ripping through the shell of a hard boiled egg to facilitate peeling the same.

2. Description of the Prior Art

Devices are known for use in peeling the shell from a hard boiled egg and by way of example reference maybe had to the following U.S. Patents: U.S. Pat. No. 4,787,306 issued Nov. 29, 1988 to G. E. Johnson; U.S. Pat. No. 4,191,102 issued Mar. 4, 1980 to C. J. Cope; U.S. Pat. No. 4,182,234 issued Jan. 8, 1980 to W. H. Reed; U.S. Pat. No. 4,149,456 issued Apr. 17, 1979 to T. Gisonni; U.S. Pat. No. 4,117,774 issued Oct. 3, 1978 to E. R. Wilburn et al; U.S. Pat. No. 4,106,402 issued Aug. 15, 1978 to J. C. Gevas; U.S. Pat. No. 4,056,051 issued Nov. 1, 1977 to E. A. Brown; U.S. Pat. No. 3,552,458 issued Jan. 5, 1971 to J. C. Whitman; U.S. Pat. No. 3,612,122 issued Aug. 6, 1969 to R. C. Bjork; and U.S. Pat. No. 2,535,980 issued Dec. 26, 1950 to C. K. Yeamans.

None of the foregoing references while pertinent teach the unique features of the present invention. The only reference considered to be of some relevancy is U.S. Pat. No. 4,117,774 in that it discloses a pointed head in which the pointed end goes between the egg shell and the hard boiled egg white. Thereafter water under pressure is introduce by way of the device between the egg shell and the egg white to remove the shell. U.S. Pat. No. 4,149,456 discloses a sleeve having resiliently biased prongs projecting into the sleeve wherein each prong has a hooked end to ripe through the egg shell and thus remove it from the firm egg white. However, neither of the forgoing references suggest or disclose any means that engages and slides over the outer surface of the egg shell and controls the depth of penetration of the shell ripper as does the present invention.

SUMMARY OF INVENTION

A principal object of the present invention is to provide a simple hand tool that can be used to make gashes in the shell of a hard boiled egg so that the shell can easily be removed while at the same time the user can be reasonably assured, due to a depth control feature, there is little likelihood of making a gouge in the egg white.

A preferred embodiment of the instant invention provides a hand tool for use in removing the shell from a hard boiled egg. The tool includes a handle readily grasped by one hand with a first and a second spaced apart pair of egg shell abutment members connected to the handle. The egg shell abutment members have respective first and second contact surfaces for engaging the outer surface of the egg shell. A shell ripper is connected to the handle and disposed between the abutment members. The ripper has a leading end portion in a plane offset in a first direction from a plane containing the first and second contact surfaces on the egg shell abutment members and a portion spaced from the leading end portion that is offset from the plane in a direction opposite the first direction.

Moreover, an embodiment of the present invention provides a hand tool for use in removing the shell from a hard boiled egg. The tool includes a handle including a first and a second spaced apart pair of egg shell abutment guide tines connected to the handle and having respective first and second contact surfaces for engaging the outer surface of an egg shell. The handle includes a longitudinal distal end defining a shell ripper tine disposed in between the pair of guide tines and the ripper tine includes an upwardly extending projection or hump spaced from the leading end portion.

Furthermore, the instant invention may also define a hand tool for use in removing the shell from a hard boiled egg including a body, a handle extending form the body, at least one longitudinal member extending therefrom defining a shell ripper member having an upwardly extending projection spaced from a leading end portion, and at least one pair of guide members extending from the body opposite the handle on each side of the shell ripper member for engaging the outer surface of an egg shell.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
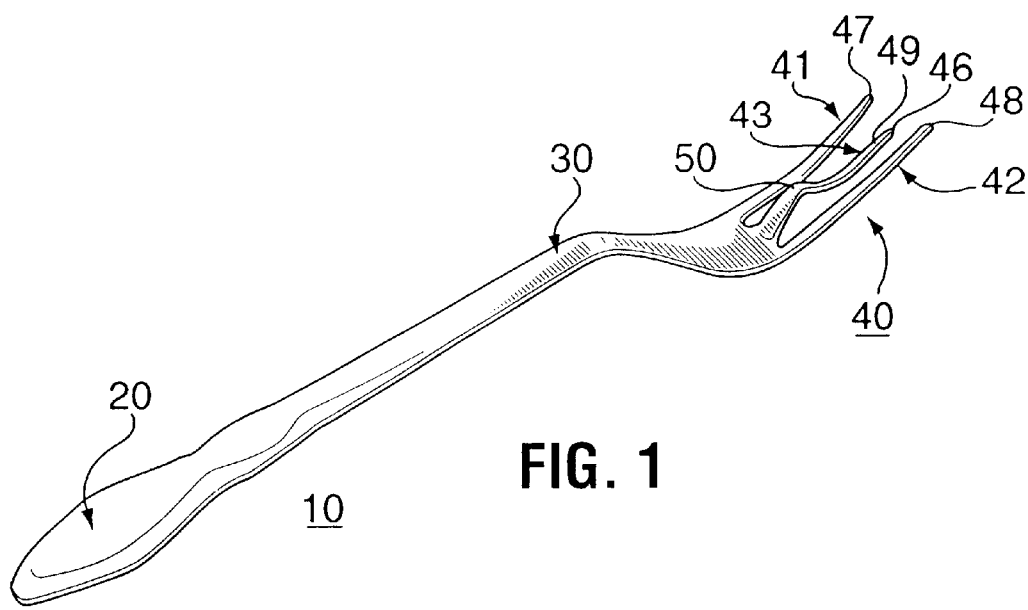
FIG. 1 is an oblique view of a hand tool of the present invention for ripping through the shell of a hard boiled egg.
Figure 2:
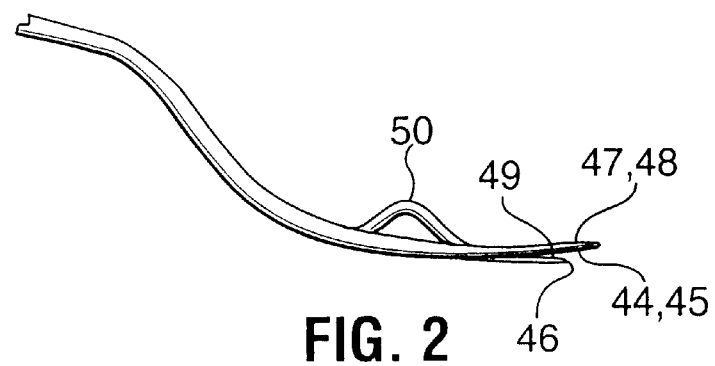
FIG. 2 is a side elevation of the tine portion of the tool.
Figure 3:
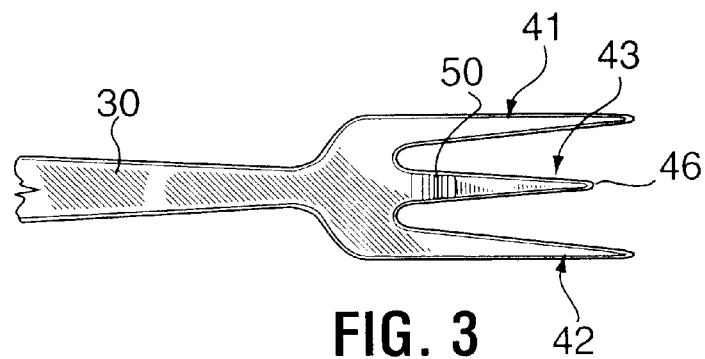
FIG. 3 is top plan view of FIG. 2.
Figure 4:
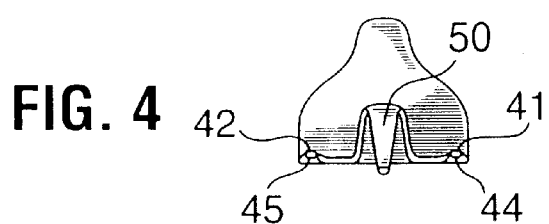
FIG. 4 is a right hand elevation view of FIG. 3.

Illustrated in the drawings 1–6 is a hand tool for ripping through the shell of a hard boiled egg. The egg ripper tool 10 comprises a handle 20 connected by way of a stem 30 to an egg shell ripper member 40 at the distal end of the tool. The egg shell ripper member 40 comprises a spaced apart pair of guide tines 41 and 42 having respective lower i.e. bottom surfaces 44 and 45 that ride on the outer surface of the egg shell and a shell ripper tine 43 disposed between the tines 41 and 42. Of course, a plurality of ripper tines or guide tines may be utilized with the instant invention as an option. The tines 41 and 42 effectively provide a depth gauge for the tool preventing the shell ripper tine 43 from gouging the surface of the cooked egg white. The ripper tine 43 has a free outer end (preferably rounded) tip 46 spaced rearwardly from the tips 47 and 48 of the respective tines 41 and 42. The ripper tine 43 has an upper surface 49 which at the tip 46 is located in a plane offset, downwardly as viewed best in FIG. 2 from a plane containing the surfaces 44 and 45 of the outer tines 41 and 42. The width of the ripper tine(s) and/or guide tine(s) may be chosen to provide optimal performance depending upon the size and/or curvature of the egg. Moreover, the ripper tine(s) and/or guide tine(s) may be of irregular width along the length thereof.

The handle provides means for gripping the tool in one hand leaving the other hand free to hold the egg. The handle should be comfortable to hold and push on in a direction toward the tines during use of the tool. The handle maybe the standard utensil handle shown or if desired some other suitable shape such as a loop, flange, or curved handle. For example, the handle maybe a closed loop connected to the stem 30 and the loop could be parallel to the plane containing the tine lower surfaces 44 and 45 or at selected angle thereto for example 90 degrees. Alternatively the handle maybe a rounded knob connected to the stem 30 or simply a bar or rod attached to the stem and disposed transversely thereto.

In the embodiment illustrated in FIGS. 1 to 4 the tool is moved during use relative to the egg, i.e., pushed toward the egg causing the tip 46 to pierce the shell of the egg. During further relative movement of the tool engaging the outer surface of the egg the tines 41 and 42 serve as runners gliding over the outer surface of the egg shell while the shell between the runners is ripped open by the ripper tine 43. A raised portion defining an upper curvature or hump 50 on the upper surface of this ripper tine spreads the shell in the ripping process and ensures the shell is broken open. A spur, or plow shaped projection may be formed on the upper surface of the ripper tine to perform the same function as the hump 50 shown in the drawings. After a suitable gash or gashes have been made, the shell can be easily removed if it hasn't already dropped off.

Figure 5:
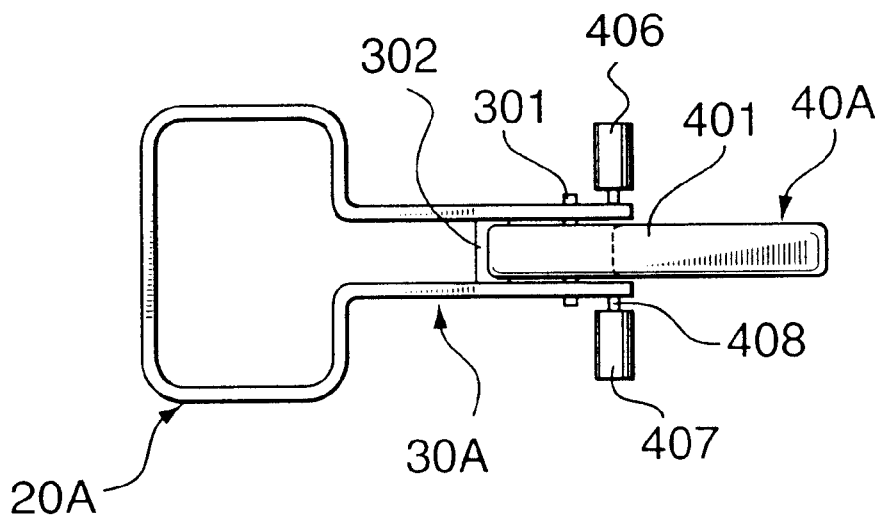
FIG. 5 is a top plan view of an alternative embodiment.
Figure 6:
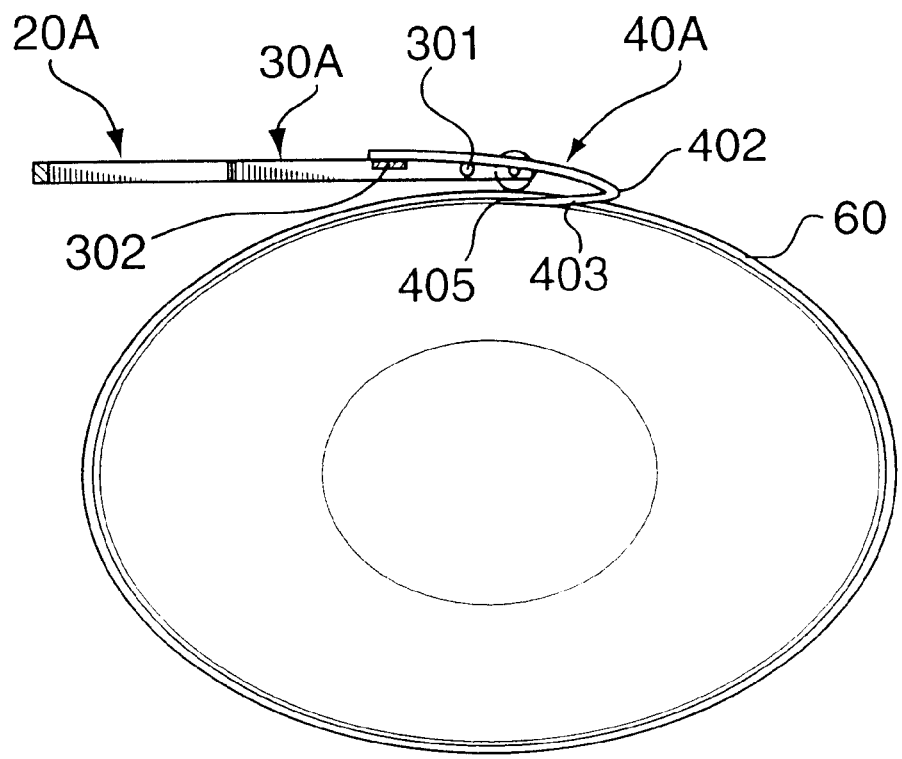
FIG. 6 is an elevational view of FIG. 5.

As illustrated in FIGS. 5 and 6, an alternative embodiment is shown that is pulled toward the user rather than pushed away from the user. Moreover, this hand tool has a loop type handle 20A having a stem 30A connected by a pivot pin 301 to an egg shell ripper member 40A. The ripper member 40A comprises an arm 401 connected to the handle by the pivot pin 301 and having a cross member 302 providing a means for limiting the pivoting motion of the arm 401. The arm 401 is reversely bent as indicated at 402 to provide an egg shell penetrating and ripping portion 403 that terminates at a tip end 405. A pair of rollers 406 and 407 are journal led on a shaft 408 that is secured to the lever arm 401. During use of the tool rollers 406 and 407 run on the outer surface of the egg shell and serve as a depth gauge controlling the depth of penetration of the tip 405 below the egg shell 60 preventing gouging the hard boiled egg white. If desired the pivot pin 301 can be eliminated in which case the arm 401 would be rigidly secured to the handle stem.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A hand tool for use in removing the shell from a hard boiled egg comprising:
    a body;
    a handle extending form said body;
    at least one longitudinal member extending therefrom defining a shell ripper member having an upwardly extending projection spaced from a leading end portion;
    at least one pair of guide members extending from said body opposite said handle on each side of said shell ripper member for engaging the outer surface of an egg shell; and
    said shell ripper member having an upper terminal end portion located a selected distance below a plane containing said guide members each having a bottom surface and a straight terminal free end.

2. A hand tool as defined in claim 1, wherein said guide members comprise a spaced apart pair of elongate members.

3. A hand tool as defined in claim 1 wherein said guide members have respective terminal ends located at a greater distance from the handle than that of said shell ripper member disposed thereinbetween.

4. A hand tool for use in removing the shell from a hard boiled egg comprising:
    a handle including a pair of spaced apart egg shell abutment guide tines connected to said handle and having respective first and second contact surfaces for engaging the outer surface of an egg shell, said handle including a longitudinal distal end defining a shell ripper tine disposed in between said pair of guide tines;
    said ripper tine including an upwardly extending projection spaced from a leading end portion thereof; and
    said ripper tine having an upper terminal free end portion located a selected distance below a plane containing said guide tines each having a bottom surface and straight terminal free end portions.

5. A hand tool as defined in claim 4 wherein said egg shell guide tines comprise a spaced apart pair of elongate members.

6. A hand tool as defined in claim 2 wherein said guide tines have respective terminal ends located at a greater distance from the handle than that of said ripper tine disposed thereinbetween.

7. A hand tool comprising a handle, three spaced apart generally parallel tines, secured to and projecting from said handle, the two outer most of said tines having a bottom surface engageable with the outer surface of an egg shell and the middle one of said tines having an upwardly extending projection spaced from a leading end portion thereof and further defining an upper terminal end portion located a selected distance below a plane containing the two outer most ones of said tines each having a bottom surface and a straight terminal free end, wherein said selected distance below a plane is below said bottom surface of said outer most tines.

8. A hand tool as defined in claim 7 wherein said two outer most tines have respective terminal ends located at greater distance from the handle than that of said middle tine.

* * * * *